United States Patent [19]
Schick et al.

[11] 3,951,858
[45] Apr. 20, 1976

[54] MANUFACTURE OF A MODIFIED TITANIUM COMPONENT FOR CATALYSTS OF THE ZIEGLER/NATTA TYPE

[75] Inventors: Hannes Schick, Mannheim; Peter Hennenberger, Ludwigshafen; Gerhard Staiger, Bobenheim-Roxheim; Heinz Mueller-Tamm, Ludwigshafen, all of Germany

[73] Assignee: BASF Aktiengesellschaft, Ludwighshafen (Rhine), Germany

[22] Filed: Jan. 8, 1974

[21] Appl. No.: 431,703

[30] Foreign Application Priority Data
Jan. 11, 1973 Germany............................ 2301136

[52] U.S. Cl. ............................ 252/429 B; 526/135; 526/348; 526/351
[51] Int. Cl.² ............... C08F 110/04; C08F 110/06; C08F 110/08; C08F 110/14
[58] Field of Search ............................. 252/429 B

[56] References Cited
UNITED STATES PATENTS

| | | | |
|---|---|---|---|
| 3,502,634 | 3/1970 | Stedefeder et al. | 252/429 B X |
| 3,639,375 | 2/1972 | Staiger et al. | 252/429 B X |
| 3,701,763 | 10/1972 | Wada et al. | 252/429 B X |

*Primary Examiner*—Patrick P. Garvin
*Attorney, Agent, or Firm*—Johnston, Keil, Thompson & Shurtleff

[57] ABSTRACT

A process for the manufacture of a modified titanium component for catalysts of the Ziegler/Natta type by milling a mixture of a titanium compound of the formula $TiCl_3 \cdot 1/3 AlCl_3$ and an organic electron donor containing phosphorus and/or nitrogen atoms. The characterizing feature is that the mixture is first milled wet in a liquid inert hydrocarbon medium under specific conditions, then separated from the hydrocarbon medium and finally milled dry under specific conditions. Such modified titanium components give catalysts which provide particularly well reproducible results in the polymerization of $\alpha$-olefins.

5 Claims, No Drawings

MANUFACTURE OF A MODIFIED TITANIUM COMPONENT FOR CATALYSTS OF THE ZIEGLER/NATTA TYPE

The present invention relates to a process for the manufacture of a modified titanium component for catalysts of the Ziegler/Natta type by milling a mixture of $a$ grammoles of a titanium compound of the formula TiCl$_3$·1/3AlCl$_3$ and 1/100$a$ to 1$a$ grammoles of an organic electron donor containing phosphorus and/or nitrogen atoms.

Processes of this kind are known in a number of variations. The main purpose of such processes is to produce modified titanium components which, after activation with organoaluminum compounds or the like, produce catalysts for use in the polymerization of α-olefins, where they produce high specific yields of poly-α-olefins and/or produce poly-α-olefins having a relatively large fraction of stereoregular polymer. See for example German published application No. 1,595,303 and Austrian Pat. Nos. 279,157; 285,932 and 285,933.

The prior processes have had considerable success, but they suffer from a certain drawback in that the reproducibility of the results obtained in the polymerization of α-olefins, particularly as regards the specific yields of poly-α-olefins, is unsatisfactory. The specific yields produced from equal batches show a relatively wide range of variation, and this is undesirable for work on an industrial scale.

It is an object of the present invention to provide a process of the type defined with which it is possible to produce modified titanium components which, when used in catalysts of the Ziegler/Natta type in the polymerization of α-olefins lead to precisely reproducible results, particularly as regards the specific yields of poly-α-olefins.

The present invention relates to a process for the manufacture of a modified titanium component for catalysts of the Ziegler/Natta type by milling a mixture consisting of $a$ grammoles of a titanium compound of the formula TiCl$_3$·1/3AlCl$_3$ with from 1/100$a$ to 1$a$ grammoles of an organic electron donor containing phosphorus and/or nitrogen atoms. The process of the invention is characterized in that the mixture of titanium compound and electron donor is first wet milled in 100$a$ to 1000$a$ grams of a liquid inert hydrocarbon medium over a period of from 0.5 to 100 hours and preferably from 1 to 20 hours at a temperature of from 0° to 50°C at a milling acceleration of from 30 to 60 m.sec$^{-2}$ and is then separated from the hydrocarbon medium and finally dry milled over a period of from 1 to 100 hours at a temperature of from 0° to 50° C and at a milling acceleration of from 30 to 60 m.sec$^{-2}$.

The following remarks relate to the materials used in our novel process.

The titanium compound having the formula stated is a conventional compound which is commercially available and thus requires no further description.

Suitable electron donors are conventional organic compounds of this type which contain phosphorus and/or nitrogen atoms. Such electron donors are described for example in U.S. Pat. No. 3,186,977. The disclosed donors have the formulas P(O)Y$_3$ and PY$_3$ wherein each Y is an alkylamino (—NR$_2$) or alkoxy (—OR'), said R and R' being alkyl radicals containing 1 to 8, preferably 1 to 4, carbon atoms.

Examples of particularly suitable electron donors are triphenylphosphine, triphenylphosphine oxide, tri-n-butylphosphine, tri-n-butylphosphine oxide, hexamethylphosphoric triamide and tertiary aliphatic and aromatic amines having a total of not more than 36 carbon atoms in the molecule. Particularly suitable are triphenylphosphine oxide, tri-n-butylphosphine and hexamethylphosphoric triamide.

The hydrocarbon medium in which the first stage of the milling is carried out may also be a conventional medium such as, in particular, petroleum, pentane, heptane and benzene.

According to the present invention, milling is carried out in two stages under specific conditions. We have found that it is advantageous to use a vibratory mill and in particular a vibratory ball mill in both stages. Separation of the milled material from the hydrocarbon medium between the two stages may be effected in a simple manner, for example by evaporating the hydrocarbon medium, preferably in vacuo.

The modified titanium components for catalysts of the Ziegler/Natta type as prepared in the process of the invention may be used for polymerizations of α-olefins in conventional manner, i.e. such titanium components will generally be used together with an organometallic activator, particularly C$_{1-8}$ alkylaluminum compounds, above all triethyl aluminum or triethyl aluminum chloride. Particularly good results are obtained in the dry polymerization of α-olefins, i.e. polymerization in the absence of liquid media. The molecular weight may be controlled by the use of conventional chain stoppers, particularly hydrogen. Suitable α-olefins to be polymerized in this manner are for example those having from 3 to 8 carbon atoms, particularly propylene, 1-butene and 4-methyl-pentene-1.

EXAMPLE a. Preparation of modified titanium component

The starting materials are 1 mole of a titanium compound of the formula TiCl$_3$·1/3 AlCl$_3$ and a solution of 1/6 mole of tributylphosphine in 500 ml of pentane. The two components are combined and milled wet for 2 hours at a temperature of 25°C in a vibratory ball mill at a milling acceleration of 50 m.sec$^{-2}$, after which they are separated from the pentane and then dry milled for 20 hours at a temperature of 15°C in a vibratory ball mill at a milling acceleration of 50 m.sec$^{-2}$.

b. Polymerization with the aid of said modified titanium component

A stirred reactor having a capacity of 0.8 m$^3$ is pressurized with propylene at a constantly controlled pressure of 28 atm. (gage) and with hydrogen at a hydrogen partial pressure of 0.5 atm. and at a constantly controlled reaction temperature of 70°C, which reactor contains a bed of 300 kg of particulate propylene polymer, from which all solvents and diluents are absent. The reactor is operated continuously in such a manner that the following components are fed at the following rates, separately from each other:

12 g/hr of the modified titanium component as prepared under (a) above, 36 g/hr of (C$_2$H$_5$)$_2$AlCl.

The product discharged from the reactor is a particulate polypropylene (average particle size 0.2 mm). It contains 60 ppm by weight of titanium and a fraction soluble in boiling n-heptane of 6% by weight. Its intrinsic viscosity is 2.3 dl/g.

When this process is carried out over a period of 1,000 hours, the polypropylene is always obtained in an hourly yield which deviates from the average value (50 kg/hr) by only ±5%.

We claim:

1. A process for the manufacture of a modified titanium component for catalysts of the Ziegler/Natta type by milling a mixture of $a$ grammoles of a titanium compound of the formula $TiCl_3 \cdot 1/3 AlCl_3$ with $1/100a$ to $1a$ grammoles of an organic electron donor selected from the group consisting of $P(O)Y_3$, $PY_3$, triphenylphosphine, triphenylphosphine oxide, tri-n-butylphosphine, tri-n-butylphosphine oxide and hexamethylphosphoric triamide wherein each Y is an alkylamino ($-NR_2$) or alkoxy ($-OR'$), said R and R' being alkyl radicals containing 1 to 8 carbon atoms, wherein the mixture of titanium compound and electron donor is first milled wet in from $100a$ to $1000a$ grams of a liquid inert hydrocarbon medium over a period of from 0.5 to 100 hours and at a temperature of from 0° to 50°C and at a milling acceleration of 30 to 60 m.sec$^{-2}$, whereupon it is separated from the hydrocarbon medium and is finally milled dry over a period of from 1 to 100 hours at a temperature of from 0° to 50°C and at a milling acceleration of from 30 to 60 m.sec$^{-2}$.

2. A process as set forth in claim 1 wherein said electron donor is selected from the group consisting of triphenylphosphine, triphenylphosphine oxide, tri-n-butylphosphine, tri-n-butylphosphine oxide and, hexamethylphosphoric triamide.

3. A process as set forth in claim 1 wherein said electron donor is triphenylphosphine oxide.

4. A process as set forth in claim 1 wherein said electron donor is tri-n-butylphosphine.

5. A process as set forth in claim 1 wherein said electron donor is hexamethylphosphoric triamide.

* * * * *